No. 624,737. Patented May 9, 1899.
G. BAY.
KNIFE WITH CONNECTED BLADES.
(Application filed July 3, 1897.)
(No Model.) 2 Sheets—Sheet 1.
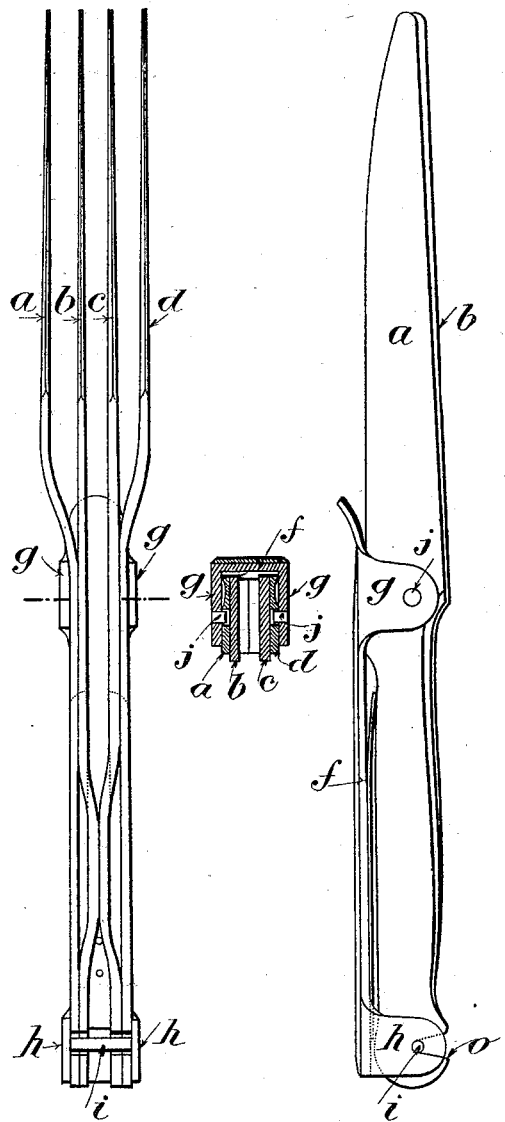
WITNESSES. INVENTOR:

No. 624,737.  
G. BAY.  
KNIFE WITH CONNECTED BLADES.  
(Application filed July 3, 1897.)  
Patented May 9, 1899.
(No Model.)  
2 Sheets—Sheet 2.
FIG. 3.   FIG. 4.   FIG. 5.
FIG. 6.
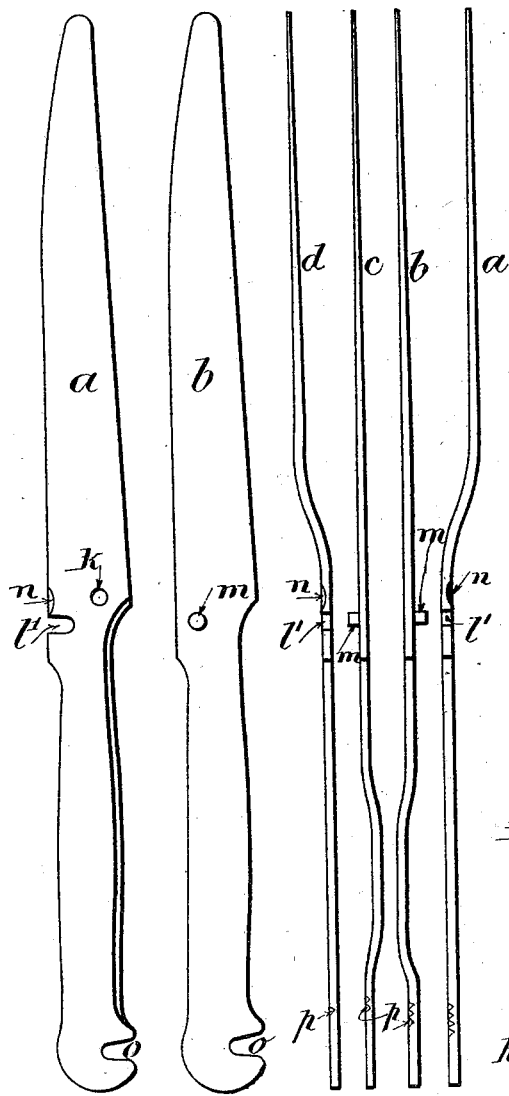
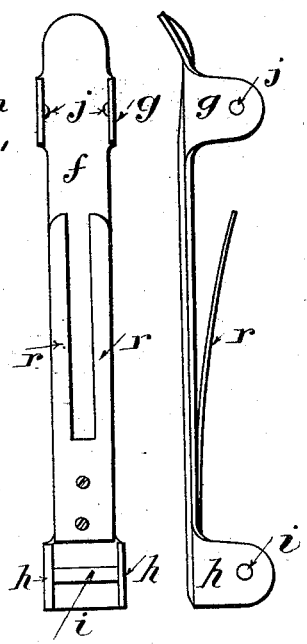
WITNESSES.  
Eugène Wattier  
Georges Laurent
INVENTOR:  
Gustave Bay

UNITED STATES PATENT OFFICE.

GUSTAVE BAY, OF PARIS, FRANCE.

KNIFE WITH CONNECTED BLADES.

SPECIFICATION forming part of Letters Patent No. 624,737, dated May 9, 1899.

Application filed July 3, 1897. Serial No. 643,397. (No model.)

*To all whom it may concern:*

Be it known that I, GUSTAVE BAY, manufacturer, of 16 Cour des Petites-Ecuries, Paris, in the Republic of France, have invented new Improvements in Knives with Connected Blades, (for which I have obtained Letters Patent of France for fifteen years, No. 257,383, dated June 19, 1896;) and I do hereby declare that the following is a full and exact description thereof, reference being made to the accompanying drawings.

My invention relates to a knife having connected blades which allow of cutting up meat properly and easily into small pieces. The blades are of the same length and arranged parallel as to their cutting parts, but in such a manner that the cutting edges of the intermediate blades project beyond those of the outer blades when in the position of rest and that the said intermediate blades can give way progressively when the knife is used to the extent of having all the blades in operation.

The knife can readily be taken to pieces, the blades separating from each other, whereby the cleaning and the sharpening of the same are rendered easy.

The knife so constructed can, according to the dimensions given to the blades, be used either as a table-knife for cutting up meat into very small parts, with a view of its being more easily masticated, or as a kitchen chopping-knife to chop raw or cooked meat for culinary purposes. I can also make on the same principle a pocket-knife or knife which shuts up and has connected blades.

In the accompanying drawings I have shown the general features and details of a table-knife made according to my invention and having four connected blades.

Figure 1 is a front view and a cross-section of the knife having four connected blades. Fig. 2 is a side view of the knife shown in Fig. 1. Fig. 3 is a side view of one of the outer blades. Fig. 4 is a side view of one of the intermediate blades. Fig. 5 represents the four blades separated and in back view in the order in which they are set up together. Fig. 6 represents the frame in elevation and side view.

By referring to the drawings it will be seen that my table-knife comprises, essentially, four or more blades of the same length $a\ b\ c\ d$, which are set up in a metal frame $f$. The four blades $a\ b\ c\ d$ have their cutting parts parallel to each other; but where the handle begins the two outer blades $a$ and $d$ are bent inward, so as to fit on the outer faces of the two intermediate blades $b\ c$, which are in turn kept a proper distance apart by being bent inward toward their back ends. The metal frame or mounting $f$ is provided at its ends with lugs $g\ g\ h\ h$, which clasp the blades tightly. The four blades have all recesses at their heels at $o$ to clasp the spindle or pin $i$, which is riveted between the lower lugs $h\ h$.

The frame or mounting $f$ is provided at the inside of its upper lugs $g\ g$ with studs $j\ j$, which come into holes $k\ k$, made in the outer blades $a\ d$ and hold the said blades in an absolutely fixed position when the knife is set up. These outer blades $a$ and $d$ are provided at their backs with recesses $l'\ l'$, in which engage the studs $m\ m$, carried by the intermediate blades $b$ and $c$. By locking the blades $a$ and $d$ by means of the studs $j\ j$ the four blades are connected at the same time to the frame or mounting $f$, and by releasing the same blades $a$ and $d$ all the four blades are released.

To allow of entering the studs $j\ j$ into the holes $k\ k$, small grooves or slideways $n\ n$ are provided on the faces of the blades $a$ and $d$, these slideways extending up to the holes $k$. The inner blades $b\ c$ spring sidewise and act by lateral pressure on the outer blades $a\ d$, the latter being brought sufficiently close together in order to be able to get the studs $j$ either into or out of the holes $k$.

When the knife is taken to pieces, all the blades are free to turn on and to be taken off the spindle $i$, the blades separating both from the frame or mounting and from each other, whereby the said blades are readily cleaned or sharpened.

The frame or mounting $f$ is of the same width as the assembled blades, and on its inner face is fixed a forked spring, the two branches $r\ r$ of which act on the backs of the inner blades $b$ and $c$ and force the studs $m$ of the said blades home in the recesses $l'$ of the blades $a\ d$, whereby the cutting edges of the said blades $b$ and $c$ are caused to project beyond the cutting edges of the outer blades $a\ d$ for the purpose of bringing in all cases the four blades into operation simultaneously. The width of the branches $r$ of the said spring is such as to make each branch press at the same time the backs of two adjacent blades, the one being an outer and the other an inner blade; but the form of the inner blades is such as to cause their cutting edges to project beyond the cutting edges of the outer blades when the backs of the four blades are in the same plane at the spring.

The inner blades $b$ and $c$ are the first to press upon the food to be cut up and then give way gradually until the outer blades $a$ and $d$ come into operation. Hence the said blades $b\ c$, acted upon by the branches of the spring $r$, are always operating, however tough the food may be in its several parts, while the contrary would be more often the case if all the blades were fixed with their cutting edges in the same plane.

In order to be able to place the blades without any hesitation in the proper order when they are required to be set up in the frame or mounting, the said blades are provided near their heels with file-marks $p$, the number of which corresponds to the place they occupy in counting from the left. Thus the outer blade on the left has one file-mark, the following one two file-marks, and so on.

I claim—

1. A knife comprising a frame, a plurality of spaced blades of substantially equal length mounted in said frame with their cutting edges parallel to each other, and springs engaging the inner blades to cause their cutting edges to project in advance of those of the outer blades.

2. A knife comprising a frame $f$ having lugs $g, h$ independent blades $a\ b\ c\ d$ of equal length and parallel as to their cutting edges, and having recesses $o$ at their heels; a spindle $i$ journaled in the lugs $h$ and engaging the recesses $o$ of the blades; studs $j$ carried by the lugs $g$ and projecting into the outer blades; and a forked spring having two members $r$ engaging the inner blades to normally hold them in projection beyond the outer blades.

3. A knife comprising a frame, inner blades $b\ c$ substantially parallel at their cutting edges and having curved engaging portions at their rear ends, said blades having studs $m$ on their outer faces and outer blades $a\ d$ substantially parallel at their cutting edges to the inner blades, and curved inwardly to engage the outer faces of the inner blades, said outer blades having on their backs notches $l'$ engaged by the said studs $m$.

4. A knife comprising a frame $f$ having at its ends parallel lugs $g$ and $h$; inner blades $b\ c$ having curved engaging portions at their rear ends, outer blades $a\ d$ engaging the inner blades at their rear portion, all of said blades having recesses $o$ at their heels; a spindle $i$ journaled in the lugs $h$ and engaging the recesses $o$ of the blades; and pins $j$ carried by the lugs $g$ and engaging apertures $k$ of the outer blades.

In witness whereof I have hereunto set my hand in presence of two witnesses.

GUSTAVE BAY.

Witnesses:
EUGÉNE WATTIER,
EDWARD P. MACLEAN.